Sept. 14, 1937.　　　　P. J. ROBINSON　　　　2,093,366
DETACHABLE FLAT BOTTOM FISHING BOAT
Filed Jan. 24, 1936　　　4 Sheets-Sheet 3
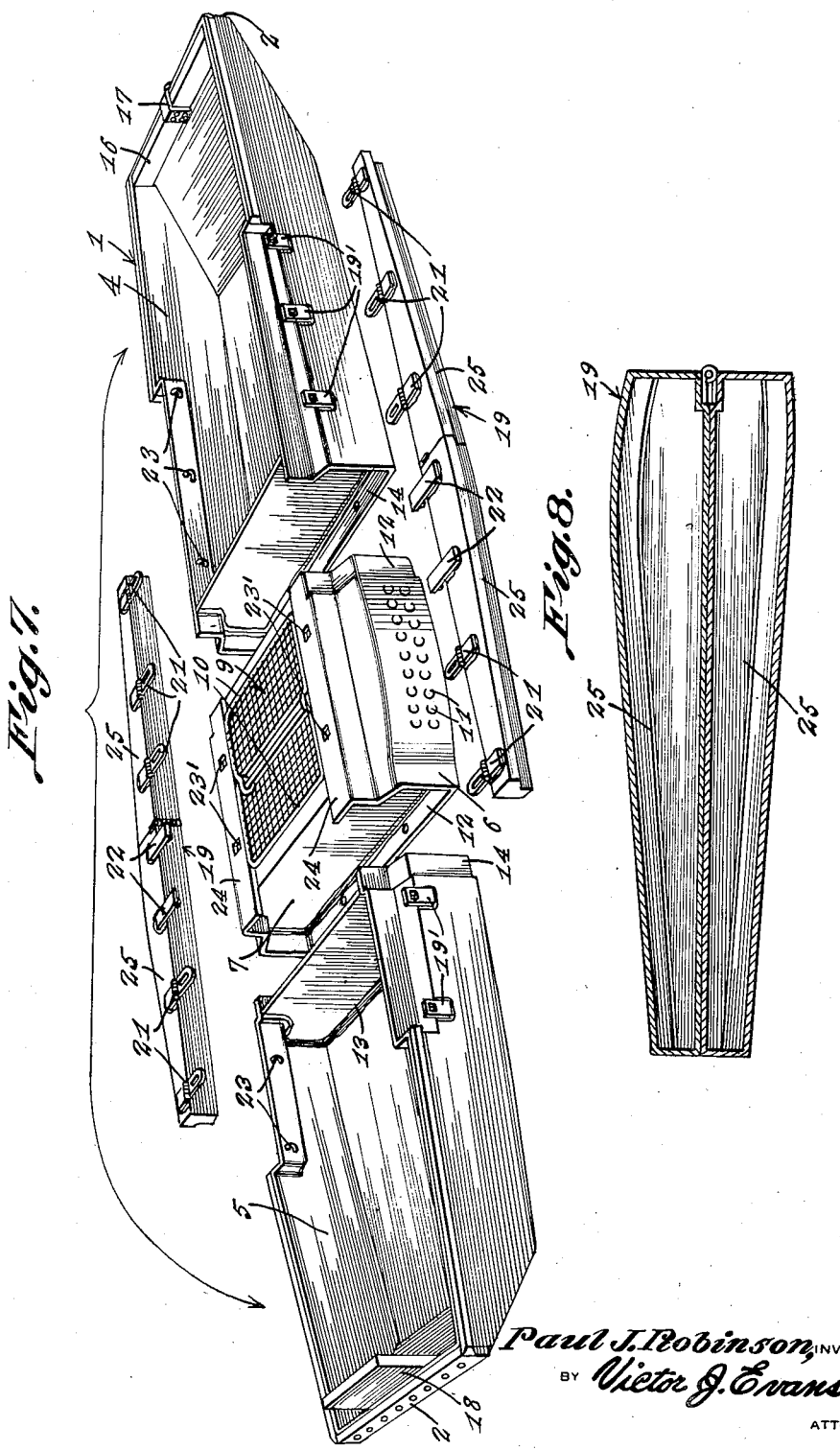

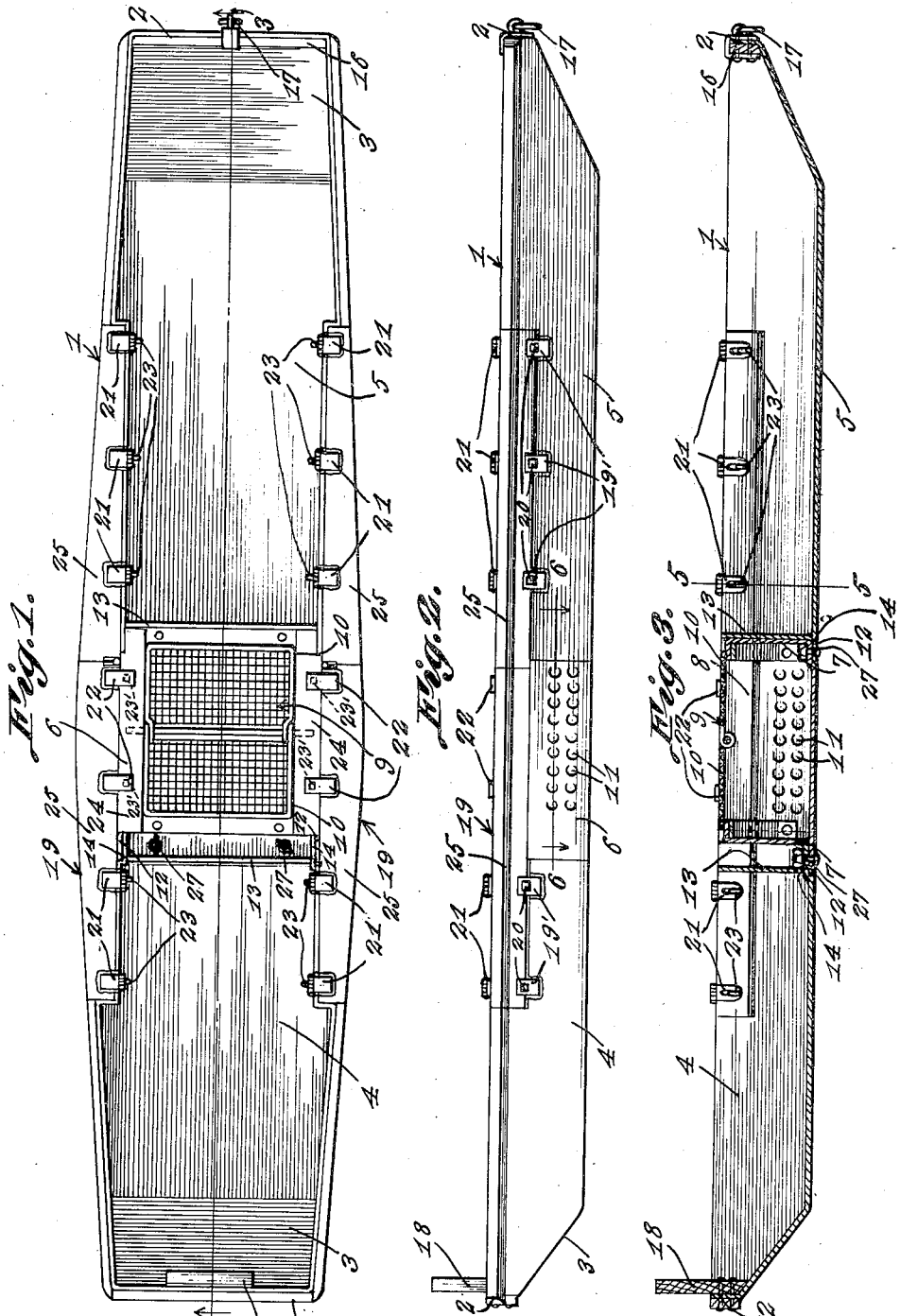

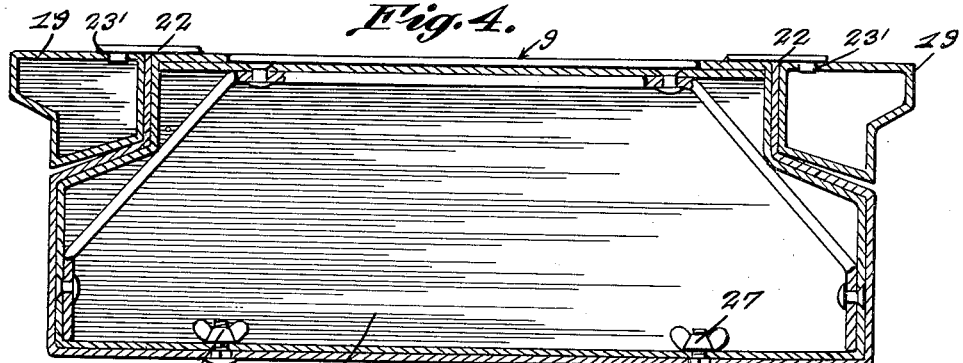
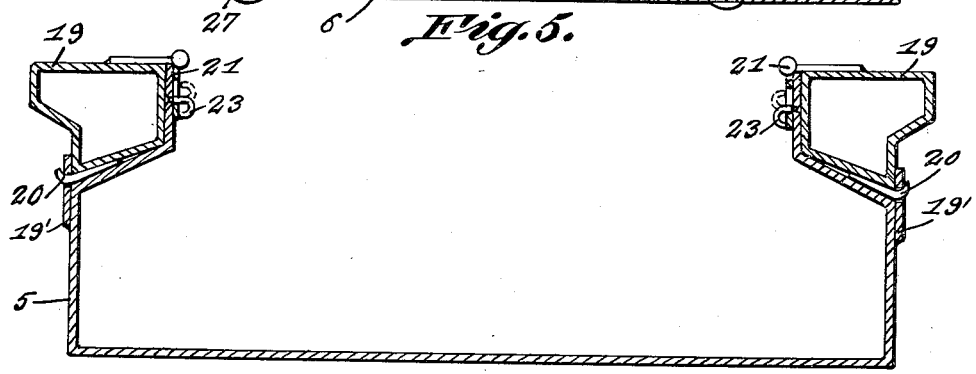
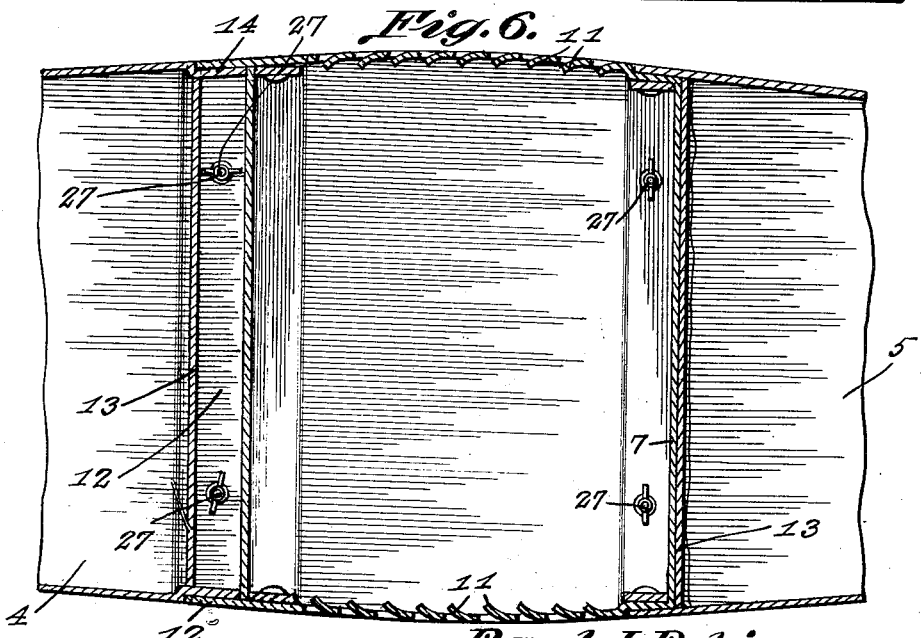

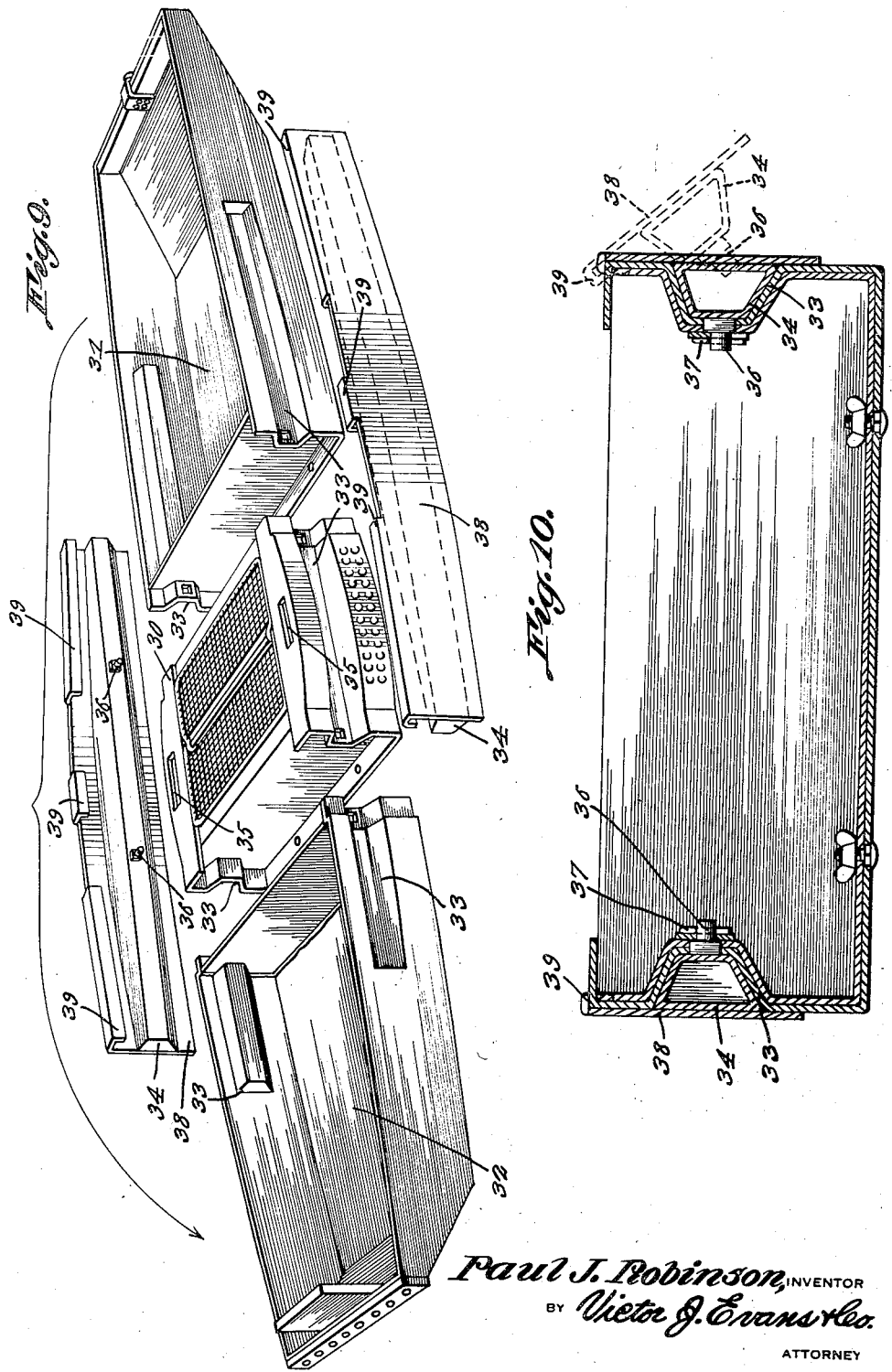

Patented Sept. 14, 1937

2,093,366

UNITED STATES PATENT OFFICE 2,093,366

DETACHABLE FLAT BOTTOM FISHING BOAT

Paul J. Robinson, Roanoke Rapids, N. C.

Application January 24, 1936, Serial No. 60,725

4 Claims. (Cl. 9—2)

This invention relates to boats especially adapted for fishing and like sports and has for the primary object the provision of a device of this character which will provide maximum safety for the occupants and is easy to propel manually or by motive power and is provided with means for keeping fish alive and fresh when caught and also in which live bait boxes may be placed to be furnished with water under circulation and forms one of a series of detachably connected sections, the other sections accommodating the occupants for fishing each being located handy to the sections in which the fish and bait are kept.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a boat constructed in accordance with my invention.

Figure 2 is a side elevation illustrating the same.

Figure 3 is a sectional view taken on the line 3—3 of Figure 1.

Figure 4 is a transverse sectional view taken on the line 4—4 of Figure 3.

Figure 5 is a transverse sectional view taken on the line 5—5 of Figure 3.

Figure 6 is a sectional view taken on the line 6—6 of Figure 2.

Figure 7 is an exploded perspective view showing the various sections of the boat.

Figure 8 is a detail sectional view showing one of the pontoons in a folded position.

Figure 9 is an exploded perspective view showing a modified form of my invention.

Figure 10 is a transverse sectional view illustrating the same.

Referring in detail to the drawings, the numeral 1 indicates a flat bottom boat having squared ends 2 with the bottom inclining upwardly at each end, as shown at 3. The sides of the boat converge slightly towards each other. A boat of this construction is capable of floating in very shallow water and is not easily tipped when more weight is on one side of the longitudinal axis of the boat than upon the other side. This boat is preferably of metallic construction so that it may be manufactured at a comparatively low cost and will be durable, safe and economical to maintain. The boat includes end sections 4 and 5 and an intermediate section 6. The intermediate section has bulkheads 7 cooperating with the side and bottom walls in forming a chamber 8 open at the top and normally closed by a grating 9. The grating is removably secured to the intermediate section 6 and includes hingedly connected sections 10 foldable towards each other to give access to the chamber 8 from either of the sections 4 or 5 so that when fish are caught by the occupants of the sections 4 and 5 they may be readily placed in the chamber 8. Also live bait boxes may be arranged in the chamber 8 whereby the bait will be in convenient reach of the occupants of the sections 4 and 5. The side walls of the section 6 have rows of openings and these openings are formed by striking out portions of the side walls and which also forms adjacent to said openings lips or tongues 11 projecting into the chamber 8. The openings and tongues permit a free circulation of water through the chamber 8 for the purpose of keeping the fish and live bait therein in a healthy condition.

The bulkheads 7 of the section 6 are spaced slightly from the ends of said section so that the bottom and side walls of said section form flanges 12. The flanges 12 at one end of the section 6 are in a plane with the respective walls while the flanges at the other end of the section 6 are offset inwardly.

Bulkheads 13 close the ends of the sections 4 and 5 which are arranged adjacent to the section 6 and said bulkheads 13 are spaced a slight distance from said ends of the sections 4 and 5 so that the bottom and side walls form flanges 14. The flanges 14 of the section 4 are in a plane with the bottom and side walls while the flanges 14 of the section 5 are offset inwardly. The flanges 14 of the section 5 are received within the flanges 12 at one end of the section 6 while the flanges 14 of the section 4 receive therein the flanges 12 at the other end of the section 6. The sections 4 and 5 are reinforced by the braces 15 located adjacent the bulkheads 13 and are secured to the bottom and side walls of said sections 4 and 5.

The section 4 at the bow end thereof is equipped with an attaching strip 16 to which is secured a mooring element 17. The stern end of the section 5 is equipped with a panel 18 forming a mounting for an outboard motor. If not desiring to employ motive power the boat may be rowed in the usual manner by equipping the latter with oarlocks (not shown).

The side walls of the sections 4, 5 and 6 are offset to form seats or channels to receive pontoons 19. The side walls of the sections 4 and 5 have secured thereto keepers 19' to receive lugs 20 secured to the pontoons and the latter have secured thereto hasps 21 and keepers 22. The hasps 21 engage with keepers 23 secured to the side walls of the sections 4 and 5 while the keepers 22 extend into openings 23' formed in marginal flanges 24 of the section 6. Thus it will be seen that the pontoons are removably secured to the sections of the boat and each pontoon includes hingedly connected sections 25 and each section has an air chamber formed therein. The pontoons when applied to the boat besides affording safety thereto also acts to aid in holding the sections 4, 5 and 6 assembled and further to secure said sections against separation. The flanges 12 and 14 are apertured to receive bolts or like fasteners, as shown at 27.

Referring to my modified form of invention the intermediate and end sections of the boat are indicated by the characters 30, 31 and 32, the side walls of which are channeled, as shown at 33, for removably receiving pontoons 34 each providing an air chamber. The sections 30, 31 and 32 are similarly constructed to the form of the invention heretofore described in detail except that the section 30 is equipped with slots 35. The pontoons are provided with fasteners 36 which extend through openings formed in the side walls of the sections 30, 31 and 32 and are anchored by cotter keys or similar elements 37. Formed integrally with the upper edges of the pontoons are flanges 39 each bent into hook-shaped formation. The flanges engage over the upper edges of the boat sections 31 and 32 as well as fitting in the slots 35 provided in the intermediate section. Of course, the sections of the boat may be further secured together by fasteners extending through flanges thereof as heretofore described.

A boat of the character described while having the advantages above set forth also is capable of being easily disassembled so that the boat can be conveniently handled and carried from one place to another over land.

Having described the invention, I claim:

1. A boat comprising a hull including non-communicative intermediate and end sections provided each with longitudinally inwardly directed channels in opposite walls thereof coextensive with each other in each of the sections, said intermediate section having slots, pontoons located in the channels and each forming an air chamber, strips secured to said pontoons and bent to form hooks, certain of which are adapted to enter the slots of the intermediate section, and the other hooks to engage over upper edges of the end sections, and means detachably connecting the pontoons to the sections of the hull.

2. A boat comprising a plurality of sections adapted to be connected in an endwise series, each section having an imperforate bulkhead and an extending flange for connection with the flange of the next succeeding section, the flanges of adjacent sections overlapping with respect to each other, securing means connecting the overlapping flanges for maintaining the sections in an assembled relationship, said sections each having longitudinal seats coextensive with each other at each side of the boat when the sections are interconnected, and a pontoon secured in each seat and cooperating with the securing means for the flanges of the sections in maintaining the sections in a securely assembled relationship.

3. A boat comprising a plurality of sections adapted to be connected in an endwise series, each section having an imperforate bulkhead and an extending flange for connection with the flange of the next succeeding section, the flanges of adjacent section overlapping with respect to each other, securing means connecting the overlapping flanges for maintaining the sections in an assembled relationship, said sections each having longitudinal seats coextensive with each other at each side of the boat when the sections are interconnected, and a pontoon in each seat, cooperating members secured on one side of each pontoon, a plurality of members at intervals along sides of the sections adapted to be engaged by said cooperating members along one side of each of the pontoons and means along the other sides of the pontoons for releasably securing them in said positions.

4. A boat in accordance with claim 3 in which each pontoon comprises hinged sections whereby when the boat sections are disassembled the pontoons may also be folded for compactness.

PAUL J. ROBINSON.